(12) United States Patent
Patterson, Jr.

(10) Patent No.: US 6,584,585 B1
(45) Date of Patent: Jun. 24, 2003

(54) VIRTUAL DEVICE DRIVER AND METHODS EMPLOYING THE SAME

(75) Inventor: John L. Patterson, Jr., Fort Worth, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/535,699

(22) Filed: Mar. 27, 2000

Related U.S. Application Data

(63) Continuation-in-part of application No. 09/074,947, filed on May 8, 1998, now Pat. No. 6,098,184.

(51) Int. Cl.[7] ............................................... G06F 11/00
(52) U.S. Cl. ................................................ 714/44; 714/21
(58) Field of Search ............................... 714/21, 49, 50, 714/55

(56) References Cited

U.S. PATENT DOCUMENTS

| | | | | |
|---|---|---|---|---|
| 5,574,858 A | * | 11/1996 | Witte | 714/56 |
| 5,991,896 A | * | 11/1999 | Cho | 714/23 |
| 6,339,833 B1 | * | 1/2002 | Guo | 714/55 |

* cited by examiner

*Primary Examiner*—Robert Beausoliel
*Assistant Examiner*—Bryce P. Bonzo
(74) *Attorney, Agent, or Firm*—Scott Charles Richardson; William J. Breen, III; Suiter - West PC LLO (57) ABSTRACT

A standalone virtual device driver that is not a mouse driver replacement or a mouse minidriver examines mouse data packets received from the mouse hardware for data packets that are obviously or likely to be faulty. When such a data packet is detected, the virtual device driver also removes the suspected faulty data by returning a null mouse packet to the mouse driver in its place. The virtual device driver may also initiate resynchronization procedures or reset the mouse hardware if necessary.

10 Claims, 5 Drawing Sheets

VIRTUAL DEVICE DRIVER AND METHODS EMPLOYING THE SAME

RELATED APPLICATION

This is a continuation-in-part of U.S. application Ser. No. 09/074,947, filed May 8, 1998, now U.S. Pat. No. 6,098,184.

FIELD OF THE INVENTION

The present invention relates generally to a virtual device driver designed to run with Microsoft Windows 95® or Windows 98® and, more particularly, to a virtual device driver which monitors mouse data packets and discards erroneous or faulty data.

BACKGROUND OF THE INVENTION

Although the keyboard is the primary computer input device in a computer system, the prevalence of graphical user interfaces (GUIs) virtually require the use pointing device such as a mouse.

A mouse uses a roller ball which rests against two rollers for translating X- and Y-axis movement into electrical signals, e.g., via an optical or opto-mechanical mechanism. A mouse will typically have a hand-sized housing and is operated by moving the mouse around on a flat surface such as a desktop or mouse pad. Similarly, a trackball is essentially the same as the mouse in terms of design, functionality, and electrical interface, but is used upside down. Rather than moving the entire device, the device is stationary with the roller ball facing upward wherein the ball may be turned with the hand directly.

Mouse button and position data are typically sent in 11-bit data bytes consisting of eight data bits plus framing and control bits. Mouse information is typically sent as three consecutive bytes. For a typical mouse such as a PS/2 mouse, the first byte of the three byte mouse data packet provides information regarding the left and right button state; the second byte of the three byte mouse data packet provides movement or displacement in the X-direction; and the third byte of the three byte mouse data packet provides movement or displacement in the Y-direction. Typically the first byte of the three byte mouse data packet will further contain data for direction of movement in the X-direction, direction of movement in the Y-direction, as well as X- and Y-overflow data bits.

In the typical mouse protocol, such as the PS/2 mouse protocol, there is no synchronization bit provided, so if a hardware communication error occurs, and one of the three bytes of the three byte mouse data packet is lost, the mouse driver will interpret the next received byte erroneously. For example, if the first data packet with button state information is lost, the second byte with X-displacement information will be erroneously interpreted as the first (button state) byte, and so forth. As a result, all subsequent mouse packets will be erroneously interpreted by the mouse driver until the mouse can be resynchronized with the driver.

It would be desirable to provide software that could improve mouse reliability by identifying and discarding faulty mouse data and resynchronizing the mouse with the mouse driver. In order to avoid replacing the standard mouse driver, which may contain very efficient hardware-dependent code, it would also be desirable to provide this functionality as a standalone virtual device driver rather than a replacement mouse driver or mouse minidriver.

SUMMARY OF THE INVENTION

The present invention is a virtual device driver (VxD) designed to run under Microsoft Windows 95® or Windows 98®. A VxD is granted the same privileges as the kernel, thus having access to the memory of the kernel and all running processes as well as raw access to the hardware. The VxD according to the present invention hooks the VMD_Manipulate_Pointer_Message service provided by the Microsoft mouse driver, as documented in the Windows 95® Device Driver Kit (DDK).

The VxD according to the present invention improves mouse reliability by examining the mouse packets received by the mouse driver and taking appropriate action when necessary.

The VxD of the present invention does not use the VMD_Manipulate_Pointer_Message to transform mouse packets, which is the original, documented purpose, but rather, to remove faulty mouse packets when they are detected. Instead of transforming a detected faulty mouse packet, the faulty mouse packet is discarded and a null mouse packet is returned in its place.

The present invention is implemented as a virtual device driver rather than a replacement mouse driver or mouse minidriver. Implementing the present invention as a VxD allows the standard Microsoft mouse driver, which may have very efficient hardware-dependent code, to handle the mouse hardware. The mouse guard VxD according to the present invention is implemented as a separate VxD which hooks a documented mouse service, namely, the VMD_Manipulate_Pointer_Message mouse service, but which uses this hook in a novel way. The Windows 95® DDK documentation indicates that the VMD_Manipulate_Pointer_Message service is designed to allow manipulation of the mouse movements, including scaling and rotation operations, rather than the use made of this service by the VxD according to the present invention, i.e., detecting and discarding faulty mouse packets.

The VxD according to the present invention can be written as a generic VxD that hooks the VMD_Manipulate_Pointer_Message function of VMOUSE when it is loaded and unloads the hook when the VxD is unloaded. The VxD monitors mouse packets processed by VMOUSE. The VxD detects faulty mouse packets according to one or more prespecified criteria and removes any such mouse packets determined to be faulty.

The VxD according to the present invention installs a hook procedure that is called by the Windows 95® or Windows 98® Virtual Mouse Driver each time a mouse packet is received. Although the present invention will be described herein primarily in reference to mouse devices compatible with the PS/2 (dedicated motherboard mouse port) mouse hardware protocol, including not only a PS/2 mouse attached to a PS/2 mouse port, but also a wireless remote control device that communicates with a device that is plugged into a PS/2 mouse port, it will be understood by those skilled in the art that the present invention can also be implemented for hardware devices that are compatible with other mouse hardware protocols, including, but not limited to serial mice, bus mice, hybrid serial/motherboard mouse port mice, and the like. Although the present invention will be discussed primarily in terms of a mouse, it will be understood the present invention may also be employed with trackball pointing devices which uses the same electrical interface and data format as the mouse. Finally, the present invention also has applicability to any input device that transfers data in the form of multi-byte words for which no synchronization data, such as a synchronization bit, is provided.

As used herein, the terms "mouse packet" or "mouse data packet" will be used to refer to a set of three consecutive mouse data bytes providing button state, X-displacement, and Y-displacement information. Table 1 shows typical information for each of the three mouse data bytes that make up a mouse packet (exclusive of framing and control bits). It should be noted that protocols may vary from one manufacturer to another and that the particular protocol shown in Table 1 is exemplary only, provided to illustrate the principles of the present invention, and is in no way limiting of the present invention.

TABLE 1

|  | D7 | D6 | D5 | D4 | D3 | D2 | D1 | D0 |
|---|---|---|---|---|---|---|---|---|
| 1st byte | YV | XV | YS | XS | 1 | 0 | R | L |
| 2nd byte | X7 | X6 | X5 | X4 | X3 | X2 | X1 | X0 |
| 3rd byte | Y7 | Y6 | Y5 | Y4 | Y3 | Y2 | Y1 | Y0 |

Table 1 illustrates an exemplary three byte mouse data packet where L=left button state (1=pressed down); R=right button state (1=pressed down); X0–X7=movement in the X-direction; Y0–Y7=movement in the Y-direction; XS=direction of the movement in the X-axis (1=up); YS=direction of the movement in the Y-axis (1=left); XV, YV=overflow of the movement data bits (1=overflow has occurred). For purposes of illustrating the present invention, the terms "first byte" and "button state byte" will be used synonymously herein, as will the terms "second byte," "X-displacement byte," and "delta-X byte," and as will the terms "third byte," "Y-displacement byte," and "delta-Y byte." However, it will be recognized by those skilled in the art that other configurations are possible and that the present invention is not limited to any particular configuration or protocol.

It is to be understood that both the foregoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1A:
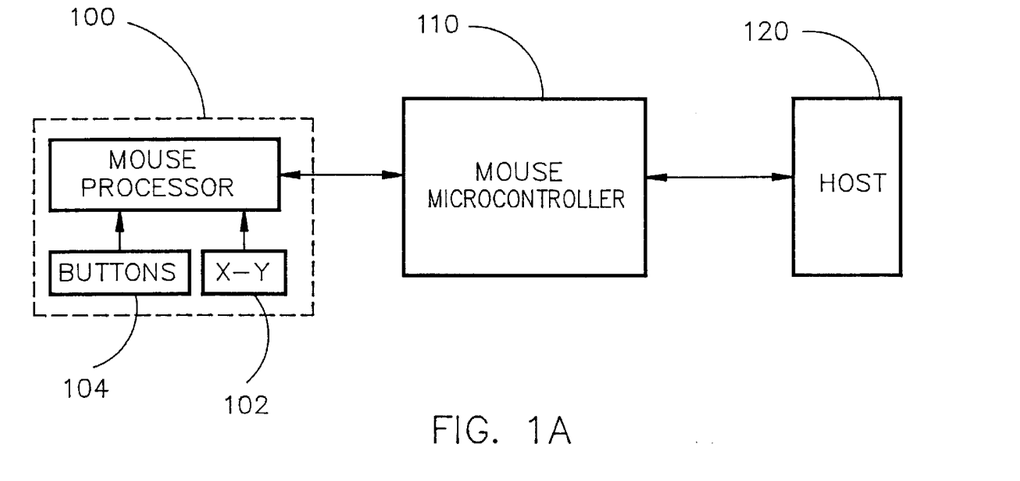
FIG. 1A shows a typical hardware configuration for use with the VxD according to the present invention.

FIG. 1A shows the basic architecture of a preferred mouse hardware configuration for use with the VxD according to the present invention. Mouse 100 comprises a mechanism 102 for converting X- and Y-displacement into an electrical signal. Mechanism 102 may be, for example, an optomechanical system which employs a light chopper that rotates in response to roller ball movement and that is disposed between a light source and a light detector. Also known are optical systems which require the mouse to be used on a special pad having a grid of different reflectances. Mouse 100 also comprises one or more buttons 104. Two-button mice are most common although one- and three-button mice are also known.

In the preferred embodiment depicted in FIG. 1A, mouse 100 is interfaced with a mouse microcontroller 110 located on the motherboard of host 120. Mouse microcontroller 110 is typically the second channel of an Intel 8042 keyboard controller, or similar type of controller. This configuration, wherein there is a dedicated mouse port connected to the motherboard, is often referred to as a PS/2 port or PS/2 mouse interface. It will be recognized that the present invention will also be applicable to a mouse connected to a serial port, such as an RS-232 port or via a universal serial bus (USB) connection, or a bus-card interface. It will also be recognized that the present invention may also be employed to improve the performance of any other input device that requires synchronization of data bytes to form data packets (words) comprising a plurality of bytes, and especially those employing a protocol that does not provide for a synchronization bit.

Figure 1B:
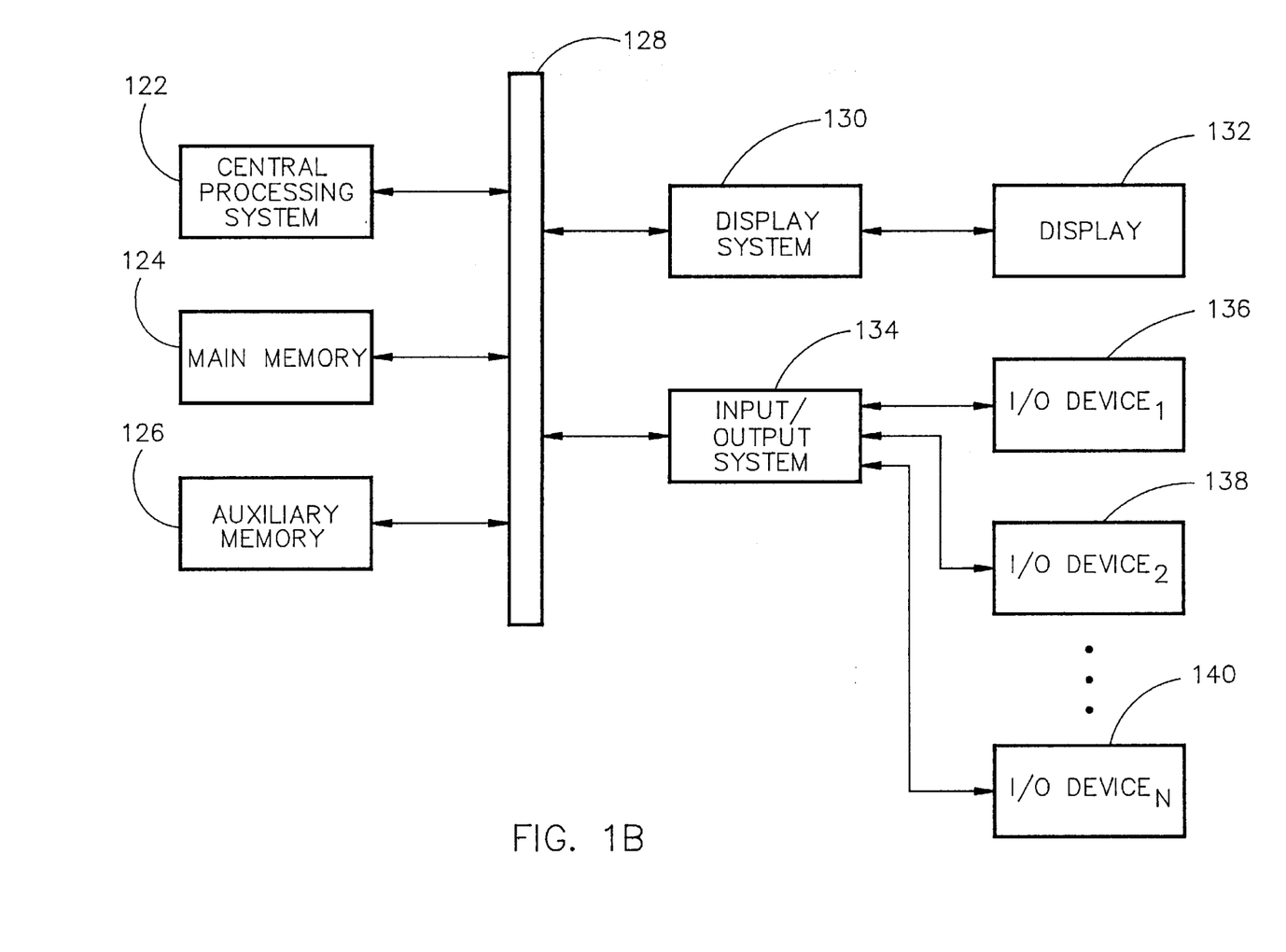
FIG. 1B is a block diagram of a computer system operable to embody the present invention.

FIG. 1B shows an exemplary hardware system in which the VxD according to the present invention may be implemented. The hardware system shown in FIG. 1B is generally representative of the hardware architecture of a computer-based information handling system of the present invention. The hardware system is controlled by a central processing system 122. The central processing system 122 includes a central processing unit such as a microprocessor or microcontroller for executing programs, performing data manipulations, and controlling the tasks of the hardware system. Communication with the central processor 122 is implemented through a system bus 128 for transferring information among the components of the hardware system. The bus 128 may include a data channel for facilitating information transfer between storage and other peripheral components of the hardware system. The bus 128 further provides the set of signals required for communication with the central processing system 122 including a data bus, address bus, and control bus. The bus 128 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system include main memory 124, and auxiliary memory 126. The hardware system may further include an auxiliary processing system (not shown) as required. The main memory 124 provides storage of instructions and data for programs executing on the central processing system 122. The main memory 124 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 126 provides storage of instructions and data that are loaded into the main memory 124 before execution. The auxiliary memory 126 may include semiconductor-based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 126 may also include a variety of non-semiconductor-based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The hardware system may optionally include an auxiliary processing system (not shown) which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system further includes a display system 130 for connecting to a display device 132, and an input/output (I/O) system 134 for connecting to one or more I/O devices 136, 138, up to N number of I/O devices 140. The display system 130 may comprise a video display adapter having all of the components for driving the display device, including memory such as video random access memory (VRAM), synchronous graphics random access memory (SGRAM), windows random access memory (WRAM), and the like, buffer, and graphics engine as desired. The display device 132 may comprise a cathode ray-tube (CRT) type display such as a monitor or television, or may comprise any alternative type of display technology such as a liquid-crystal display (LCD), light-emitting diode (LED) display, gas or plasma display, electroluminescent display, vacuum fluorescent display, or cathodoluminescent (field emission) display. The input/output system 134 may comprise one or more controllers or adapters for providing interface functions between the one or more I/O devices 136–140. For example, the input/output system 134 may comprise a serial port, parallel port, universal serial bus (USB) port, infrared port, network adapter, printer adapter, radio-frequency (RF) communications adapter, universal asynchronous receiver-transmitter (UART) port, etc., for interfacing between corresponding I/O devices, to include an input device employed with the VxD according to the present invention. Exemplary input devices include, for example, a mouse, trackball, touchpad, joystick, trackstick, keyboard, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 134 and I/O devices 136–140 may provide or receive analog or digital signals for communication between the hardware system of the present invention and external devices, networks, or information sources. The input/output system 134 and I/O devices 136–140 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system of FIG. 1B by one having ordinary skill in the art would not depart from the scope or the spirit of the present invention.

Figure 2:
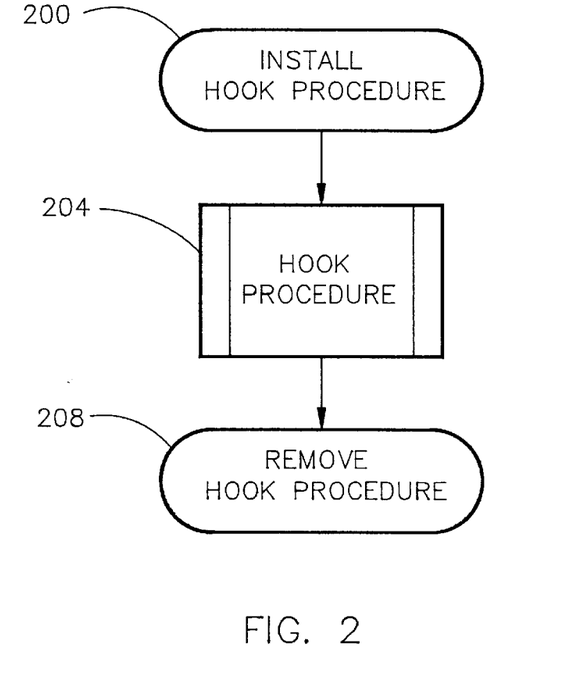
FIG. 2 depicts a flow chart outlining the basic operation of the present invention.

FIG. 2 illustrates the basic operation of the present invention. The mouse guard VxD according to the present invention has three main functions: installation, removal, and the hook procedure. The installation function 200 calls the Virtual Machine Manager's function, Hook_Device_Service, for the VMD_Manipulate_Pointer_Message so that the hook procedure 204 according to the present invention is called every time a mouse packet is received. The installation function 200 is called when the VxD according to the present invention is dynamically installed.

The removal function 208 calls the Virtual Machine Manager's function, Unhook_Device_Service, on the hook procedure 204 according to the present invention so that when the VxD according to the present invention is unloaded, the mouse driver will not attempt to call the hook procedure 204 any longer. The removal function 208 is called whenever the VxD according to the present invention is informed that it is about to be dynamically unloaded. In a preferred embodiment, the PLUGPLAY VxD sample driver provided in the Windows 95® DDK may be adapted to implement the dynamic initialization and removal code properly. Once the installation, removal, and the hook procedure functions are set up, the VxD according to the present invention may be compiled and/or assembled using the standard Windows 95® DDK techniques. The PLUGPLAY driver's sample INF file may be adapted to aid in the installation of the VxD according to the present invention. The VxD according to the present invention is installed under Windows 95® as an "Unknown" device, not as a mouse minidriver, using the standard Windows 95® "Add Hardware" procedure. Alternatively, the VxD according to the present invention can be installed under its own custom class in Windows 95®.

Figure 3:
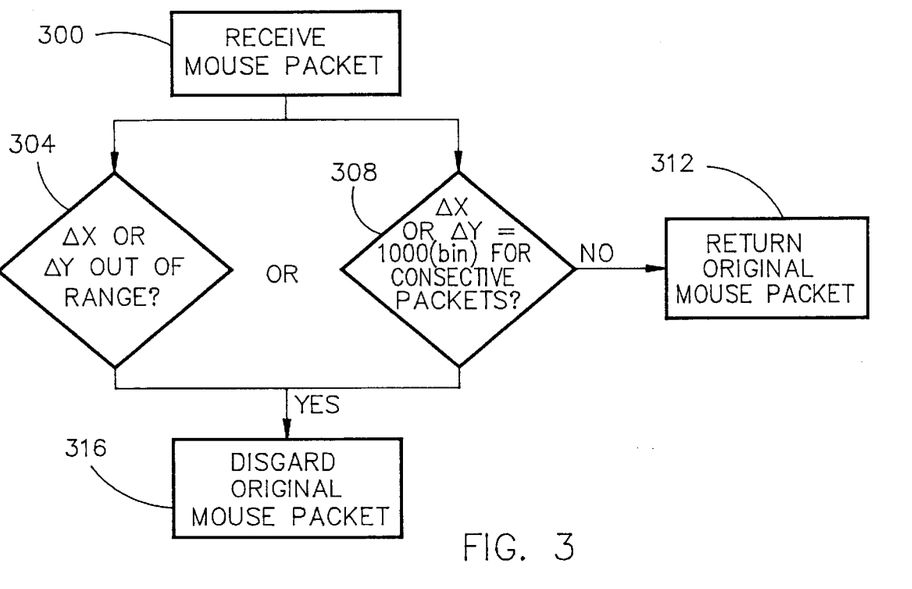
FIGS. 3 and 4 are flow charts describing the hook procedure of the present invention.

Exemplary embodiments of the hook procedure 204 (FIG. 2) are shown in FIGS. 3–6. The hook procedure function 204 (FIG. 2) is called every time that the mouse driver assembles a mouse packet from the mouse hardware. Referring now to FIG. 3, in step 300, the hook procedure receives the mouse packet and is provided with three pieces of information: the current state of the mouse buttons, the relative horizontal displacement since the last mouse packet, and the relative vertical displacement since the last mouse packet. The hook procedure can manipulate these three values to change the behavior of the mouse, or can leave the three values alone.

The hook procedure of the VxD according to the present invention has three major responsibilities: to detect faulty mouse behavior, discard faulty mouse packets, and resynchronize the mouse hardware to the mouse driver or, if necessary, reset the mouse hardware.

Mouse data that may be presumed to be faulty is detected by monitoring the mouse data for predefined or prespecified values or data patterns indicating that the mouse data is obviously faulty or, at least, likely to be faulty. As used herein, mouse data stated to be faulty will generally refer to mouse data presumed to be faulty according to the predefined criteria of the VxD according to the present invention. The VxD according to the present invention does not attempt to determine whether an error has, in fact, occurred.

One criteria for detecting faulty mouse behavior is to test, in step 304, the relative horizontal displacement (hereinafter referred to as "delta-X") and relative vertical displacement (hereinafter referred to as "delta-Y") of the current mouse packet received in step 300 to determine if it is outside of a predetermined range, such as a displacement that would not be possible within one mouse report period.

Although 32-bits of resolution for the delta-X and delta-Y are provided to the hook procedure, the particular mouse hardware is usually capable of far fewer bits of resolution. In the case of the PS/2 mouse, the largest mouse displacement placement appears to be 7-bits, which would be a displacement of 0×7 F (hexadecimal). Therefore, in the case of a PS/2 mouse, when the hook procedure detects a delta-X or delta-Y displacement of 0×80 or larger in step 304, it is safe to assume that the current mouse packet is faulty.

A second method detecting faulty mouse data packets is to check the data for unusual patterns that can indicate faulty behavior. In the case of the PS/2 mouse it has been discovered that, in accordance with the present invention, faulty behavior is strongly correlated with consecutive delta-X or delta-Y values that have the following property: a particular subset of the bits of the delta-X or delta-Y value remain the same across several consecutive mouse packets. As an example, it has been observed that if the lower 4-bits of the delta-X or delta-Y value is reported as 1000 (binary) for several consecutive mouse packets, it is likely that the mouse packets being received from the mouse are faulty. This is likely caused by the mouse hardware getting out of sync with the mouse driver. As described above, a PS/2 mouse protocol mouse packet consists of three bytes: a button state byte, a delta-X byte, and a delta-Y byte. There is no synchronization bit in this protocol, so if a hardware or communication error occurs, and one of the three bytes of a mouse packet is lost, the mouse driver will interpret the next byte erroneously. For example, if the first byte of the three-byte data packet is lost, the second byte containing delta-X information will be erroneously interpreted as the button state byte, the third byte containing delta-Y information will be erroneously interpreted as the delta-X byte, and the first byte of the next transmitted mouse packet containing button state information will erroneously be interpreted as the delta-Y byte of the previous packet, and so on. The same is true if a hardware or communication error results in the loss of a second or third byte, or if multiple bytes are lost.

In step 308, the mouse data packets received in step 300 are examined for an unusual pattern persistent over two or more consecutive mouse packets. If the delta-X and delta-Y are within the predefined limits and no unusual patterns are noted, such as a value of 1000 (bin) in the lower four bits of the delta-X or delta-Y bytes in the case of a PS/2 mouse as has been discovered in accordance with the present invention, the hook procedure returns the original mouse packet in step 312. If the mouse packet received in step 300 is not identified as a faulty mouse packet in steps 304 or 308, then the original mouse packet is presumed to be correct and the original packet data values are returned. If the mouse packet received in step 300 is identified as faulty in either step 304 or 308, the mouse packet is discarded in step 316. The process of FIG. 3 is performed for each mouse packet received from the mouse.

Figure 4:
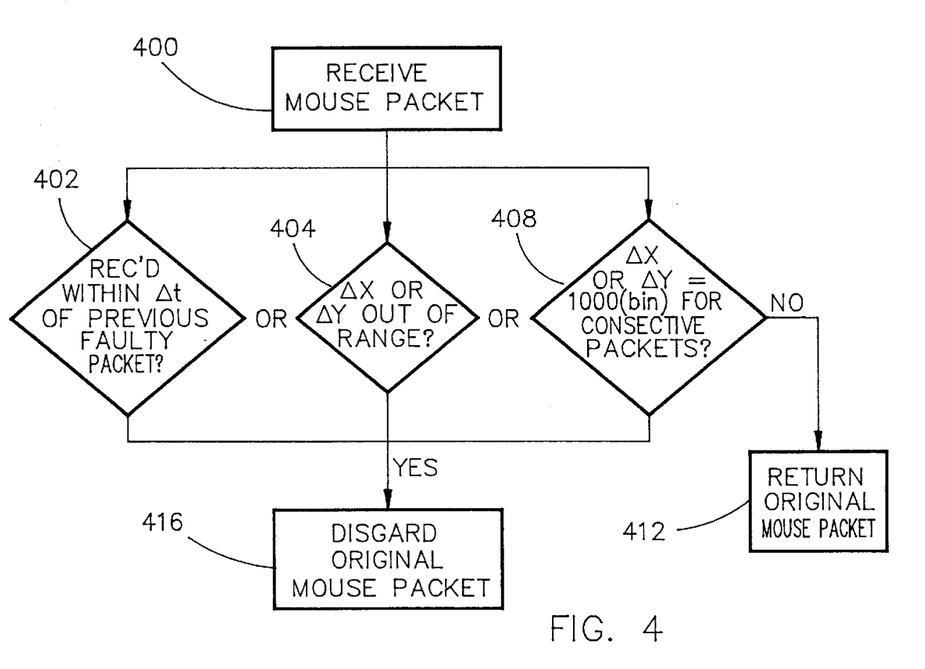

An additional criterion for detecting faulty mouse data packets is based on the observation that faulty mouse packets are often received in groups. Thus, in addition to the two criteria for identifying mouse data packets that are obviously faulty or suspected as likely being faulty as described above, namely examining the mouse packets for out of range delta-X or delta-Y displacements and for unusual patterns in consecutive packets, a third criteria for discarding mouse packets is based on whether a given mouse packet is received within some short predetermined period of time from the time of receipt of a mouse packet identified to be or suspected to be faulty under the first two criteria. Individual faulty packets, some with false button presses, do not always have an obvious out-of-range indication. A faulty mouse packet discovered in accordance with the present invention is, therefore, used as a red flag that subsequent mouse packets are not to be trusted and should be discarded for a short period of time until the problem is resolved by itself or until resynchronization procedures are successful. This process is outlined in FIG. 4. In step 400, the original mouse packet is received. If the current mouse packet is determined, in step 402, to have been received within a predetermined period of time from the receipt of a previous packet identified as faulty, the mouse packet will be disregarded (step 416), whether or not the packet is obviously faulty or possibly good. Likewise, if the mouse packet is identified as being obviously or likely to be faulty, i.e., as being out of range (step 404) or is one of several consecutive packets having an unusual pattern (step 408), the mouse packet will be discarded (step 416). It the packet is not identified as faulty under the criteria of steps 404 and 408, and is not received within a predetermined period of time after a previously faulty mouse packet (step 402), then the hook procedure according to the present invention returns the original mouse packet in step 412. The process of FIG. 4 is performed for each mouse packet received from the mouse.

By the term "discarded," it is meant that all data in the mouse packet is disregarded and a null packet is substituted therefore. By returning a null packet, inaccurate, false button presses which are often present in illegal packets will not be processed by the mouse driver and thus, will not be seen by the user. In a null packet, the button state reflects that no buttons have been pressed, the delta-X value is zero, and the delta-Y value is zero.

Figure 5:
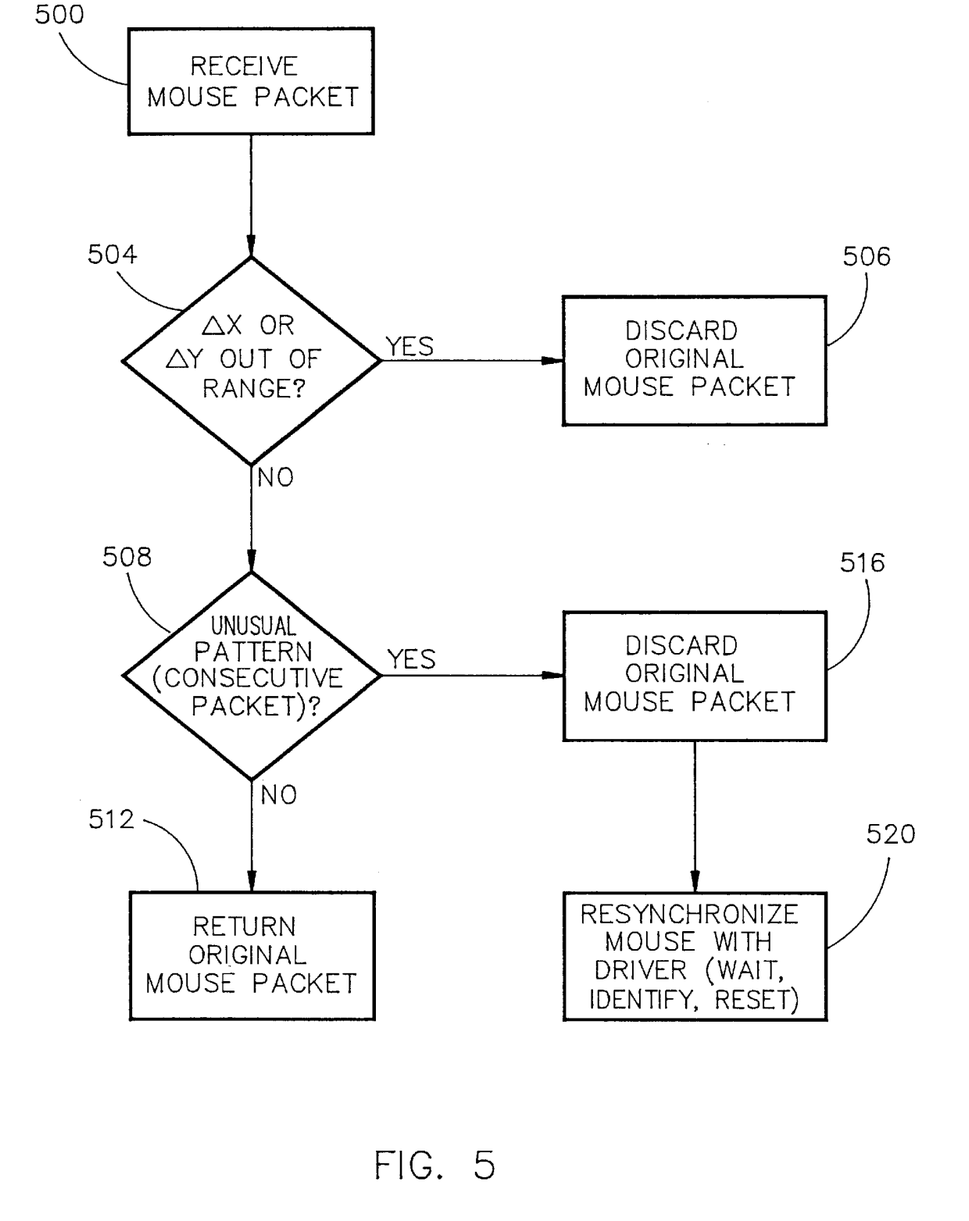
FIGS. 5 and 6 are flow charts outlining a preferred embodiment according to the present invention wherein the mouse is resynchronized with the mouse driver upon the detection of faulty mouse data.

FIG. 5 shows outlines an embodiment according to the present invention incorporating a resynchronization step. In step 500, a mouse packet is received. If the delta-X or delta-Y value is out of range in step 504, the mouse packet is discarded in step 506. If the delta-X and delta-Y values are within the range, it is determined whether the packet is one of several consecutive packets having a prespecified unusual data bit pattern in a prespecified subset of data bits in step 508. If the packet is deemed not to be one of several consecutive packets having a prespecified unusual pattern, the original mouse packet is returned in step 512. If an unusual pattern is found in the mouse packet in step 508, the original mouse packet is discarded in step 516 and the mouse is resynchronized with the mouse driver in step 520. The process of FIG. 5 is repeated for each mouse packet received.

Figure 6:
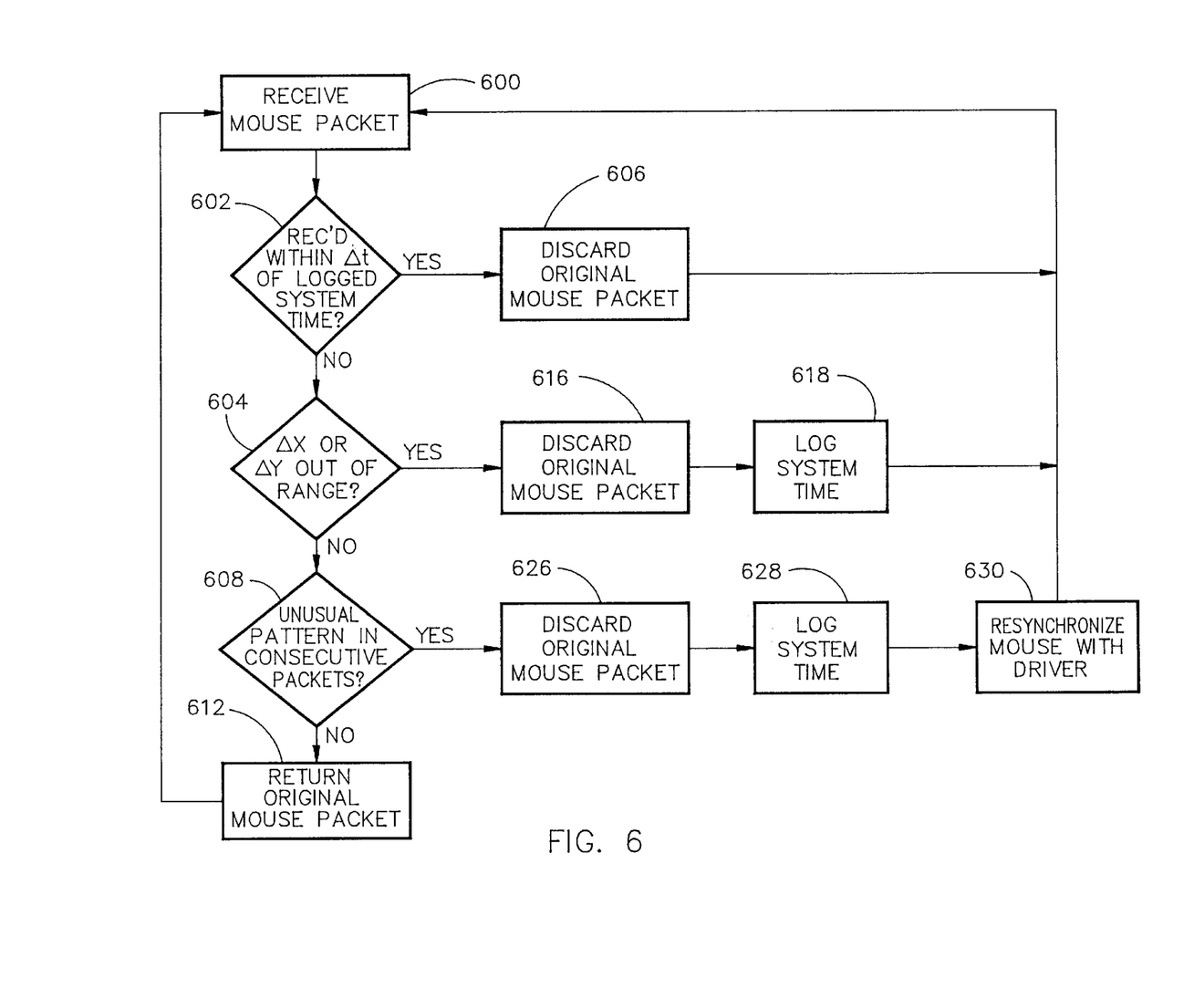

FIG. 6 shows an embodiment according to the present invention similar to that shown in FIG. 5, with the additional steps of logging the system time upon the receipt of an obviously or likely faulty mouse packet and discarding subsequent mouse packets for a prespecified time period, even if such mouse packets are possibly good (i.e., would not be presumed faulty by the present VxD). The mouse packet is received in step 600. In step 602, it is determined whether the mouse packet has been received within a prespecified time period of a previously logged system time, i.e., logged in response to a previously received mouse packet presumed to be faulty under steps 604 or 608. If the mouse packet has been received within such a specified time period, the mouse packet is discarded in step 606 and the process returns to step 600. If the mouse packet has not been received within such a specified time period, it is determined whether the delta-X or delta-Y value is out of range in step 604. If the delta-X or delta-Y value is out of range, the mouse packet is discarded in step 616 and the system time as reported by the operating system is logged in step 618 and the process returns to step 600. If the delta-X and delta-Y values are within range, it is determined whether the packet is one of several consecutive packets having a prespecified unusual data bit pattern in a prespecified subset of data bits in step 608. If the packet is deemed not to be one of several consecutive packets having a prespecified unusual pattern, the original mouse packet is returned in step 612. If an unusual pattern is found in the mouse packet in step 608, the original mouse packet is discarded in step 626 and the system time is logged in step 628. The mouse is then resynchronized with the mouse driver in step 630 and the process returns to step 600.

The mouse can be resynchronized with the mouse driver in a number of ways, including waiting to see if the problem resolves itself, sending a specific IDENTIFY command sequence to the mouse hardware, and resetting mouse hardware.

In waiting to see if a suspected resynchronization problem resolves itself, the system time may be logged when an obviously or likely faulty data packet is received, as described above. All subsequent data received within a predetermined period of time are discarded, e.g., replaced with a null packet by the VxD according to the present invention.

The mouse hardware and the mouse driver may also be resynchronized by the VxD according to the present invention by sending a command that causes the mouse to emit a data packet containing a different number of data bytes than the three-byte mouse information data packet. This may be accomplished, for example, by sending an IDENTIFY command sequence to the mouse hardware which causes the mouse hardware to send data packets identifying itself. Resynchronization may be effected in this manner because the mouse identification data packets typically consist of a different number of bytes than the three-byte mouse data packets generated during mouse operation.

In the case of a PS/2 mouse, resynchronization is preferably accomplished by sending an "IDENTIFY YOUR-SELF" command to the mouse hardware. As stated above, in the case of the PS/2 mouse, when the lower four bits of several consecutive delta-X or delta-Y packets appear to be stuck at 1000 (binary), it may be presumed that there is a synchronization error. When a presumed synchronization error occurs, this IDENTIFY command can be performed by writing 0xD4 to I/O port 0x64 and then sending 0xF2 to I/O 0x60. When the PS/2 mouse identifies itself, it emits two bytes of identification data. The fact that only two bytes are generated may be exploited by the present invention to effect a resynchronization. The VxD according to the present invention does not read these two bytes, but rather allows the mouse driver to read these bytes, which it will interpret as two bytes of a three byte mouse packet. This process may be performed as necessary until the mouse hardware is in sync with the driver. In a preferred embodiment, the mouse is caused to identify itself twice, in which case four bytes will be generated. In this manner, the mouse driver expecting data in three-byte packets will receive an "extra" byte which will effect a resynchronization when the mouse hardware and driver have become out of sync due to the loss of a single byte of a three-byte packet. In other words, generating identification data twice generates four bytes which will compensate for a single lost byte.

The hook procedure may also effect a resynchronization by resetting the mouse hardware. In a system with a PS/2 port using the standard resources, the VxD according to the present invention can reset the mouse by sending 0xD4 to I/O port 0x64 and then sending 0xFF to I/O port 0x60. Resetting the mouse hardware is preferably reserved for extraordinary circumstances, for example, when the above procedures (waiting and/or requesting identification) have been unsuccessful. In the case of the PS/2 mouse protocol, the hook procedure according to the present invention sends a RESET command sequence to the mouse, and then sets up a global timeout event to be scheduled in the future, e.g., after a few hundred milliseconds. It is assumed that the mouse driver, and not the VxD according to the present invention will read the bytes from the mouse hardware that are generated when the reset is complete before the global timeout event is called. In the global timeout event code provided in the VxD according to the present invention, the PS/2 mouse's resolution and sampling rate are restored to the normal (but non-default) values, and then the PS/2 mouse is reenabled.

It will be recognized that the present invention may employ any one of the above resynchronization techniques, or, may employ any two or more of the above techniques. In one embodiment according to the present invention, the IDENTIFY command sequence for effecting a resynchronization as described above may be employed only if the suspected synchronization error is not resolved by waiting (discarding all mouse packets) for a predetermined period of time. In another embodiment, the hardware RESET command as described above may be employed only where the IDENTIFY command and/or waiting fails to resolve the suspected synchronization error. In a preferred embodiment, an IDENTIFY command is sent only if waiting is unsuccessful, and a RESET command is sent only if the IDENTIFY command sequence is unsuccessful.

The following algorithm illustrates an embodiment of the present invention wherein the VxD according to the present invention, upon detection of an obviously or likely false packet, will reset the mouse hardware, record the current system time so that it can ignore any packets that are received within a predetermined number of milliseconds of the false mouse packet, and replace the false packet with a null packet:

```
if (|Δx|>LIMIT OR |Δy|>LIMIT)
{
    Reset the mouse hardware
    Set Start__Ignore__Timer__Valid=TRUE
    Set Start__Ignore__Timer=Current System Time reported
        by Operating System
    Return a NULL mouse packet
}
else
{
    if (Start__Ignore__Timer__Valid=TRUE)
    {
        if (Current System Time reported by Operating Sys-
            tem
        Start__Ignore__Timer<Δt)
            Return a NULL mouse packet
        else
        {
            Start__Ignore Timer__Valid=FALSE
            Return the ORIGINAL mouse packet
        }
    }
}
``` else
    return the ORIGINAL mouse packet
}

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 124 of one or more computer systems configured generally as described in FIG. 1B. Until required by the computer system, the set of instructions may be stored in another computer readable memory such as the auxiliary memory of FIG. 1B, for example in a hard disk drive or in a removable memory such as an optical disk for utilization in a CD-ROM drive, a magnetic media for utilization in a magnetic media drive, a magneto-optical disk for utilization in a magneto-optical drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A computer-implemented method for processing signals encoding computer readable data being input to a computer by an input device, said data being of a type transmitted in the form of data packets comprising a plurality of bytes and said data being further of a type lacking synchronization data, said method steps comprising:
  defining one or more criteria by which it is assumed that an error in the synchronization of said plurality of bytes has occurred;
  receiving the data packets input to the computer;
  examining each received data packet for conformance with said one or more criteria; and
  resynchronizing the input device when a received data packet conforms with at least one of said one or more criteria.

2. A program storage device readable by a machine, tangibly embodying a program of instructions executable by the machine to perform method steps for processing signals encoding computer readable data being input to a computer by an input device, said data being of a type transmitted in the form of data packets comprising a plurality of bytes and said data being further of a type lacking synchronization data, said method steps comprising:
  defining one or more criteria by which it is assumed that an error in the synchronization of said plurality of bytes has occurred;
  receiving the data packets input to the computer;
  examining each received data packet for conformance with said one or more criteria; and
  resynchronizing the input device when a received data packet conforms with at least one of said one or more criteria.

3. A computer system for processing signals encoding computer readable data being input to a computer by an input device, said data being of a type transmitted in the form of data packets comprising a plurality of bytes and said data being further of a type lacking synchronization data, said computer system comprising:
  means for defining one or more criteria by which it is assumed that an error in the synchronization of said plurality of bytes has occurred;
  means for receiving the data packets input to the computer;
  means for examining each received data packet for conformance with said one or more criteria; and
  means for resynchronizing the input device when a received data packet conforms with at least one of said one or more criteria.

4. A computer-implemented method for processing signals encoding computer readable data being input to a computer by an input device, said data being of a type transmitted in the form of data packets comprising a plurality of bytes and said data being further of a type lacking synchronization data, said method steps comprising:
  defining one or more criteria by which it is assumed that an error in the synchronization of said plurality of bytes has occurred;
  receiving the data packets input to the computer;
  examining each received data packet for conformance with said one or more criteria; and
  replacing each data packet that conforms with at least one of said one or more criteria with a null packet.

5. A program storage device readable by a machine, tangibly embodying a program of instructions executable by the machine to perform method steps for processing signals encoding computer readable data being input to a computer by an input device, said data being of a type transmitted in the form of data packets comprising a plurality of bytes and said data being further of a type lacking synchronization data, said method steps comprising:
  defining one or more criteria by which it is assumed that an error in the synchronization of said plurality of bytes has occurred;
  receiving the data packets input to the computer;
  examining each received data packet for conformance with said one or more criteria; and
  replacing each data packet that conforms with at least one of said one or more criteria with a null packet.

6. A computer system for processing signals encoding computer readable data being input to a computer by an input device, said data being of a type transmitted in the form of data packets comprising a plurality of bytes and said data being further of a type lacking synchronization data, said computer system comprising:
  means for defining one or more criteria by which it is assumed that an error in the synchronization of said plurality of bytes has occurred;
  means for receiving the data packets input to the computer;
  means for examining each received data packet for conformance with said one or more criteria; and means for replacing each data packet that conforms with at least one of said one or more criteria with a null packet.

7. A computer-implemented method for processing signals encoding computer readable data being input to a computer by an input device, said data being of a type transmitted in the form of data packets comprising a plurality of bytes and said data being further of a type lacking synchronization data, said method steps comprising:

(a) defining one or more criteria by which it is assumed that an error in the synchronization of said plurality of bytes has occurred;

(b) receiving the data packets input to the computer;

(c) examining each received data packet for conformance with said one or more criteria;

(d) logging the time at which a presumed data packet is received;

(e) replacing the data packet that is presumed faulty with a null packet; and (f) replacing each data packet received with a null packet for a prespecified period of time after the time is logged in step (d).

8. A program storage device readable by a machine, tangibly embodying a program of instructions executable by the machine to perform method steps for processing signals encoding computer readable data being input to a computer by an input device, said data being of a type transmitted in the form of data packets comprising a plurality of bytes and said data being further of a type lacking synchronization data, said method steps comprising:

(a) defining one or more criteria by which it is assumed that an error in the synchronization of said plurality of bytes has occurred;

(b) receiving the data packets input to the computer;

(c) examining each received data packet for conformance with said one or more criteria;

(d) logging the time at which a presumed data packet is received;

(e) replacing the data packet that is presumed faulty with a null packet; and (f) replacing each data packet received with a null packet for a prespecified period of time after the time is logged in step (d).

9. A computer system for processing signals encoding computer readable data being input to a computer by an input device, said data being of a type transmitted in the form of data packets comprising a plurality of bytes and said data being further of a type lacking synchronization data, said computer system comprising:

means for defining one or more criteria by which it is assumed that an error in the synchronization of said plurality of bytes has occurred;

means for receiving the data packets input to the computer;

means for examining each received data packet for conformance with said one or more criteria;

means for logging the time at which a presumed data packet is received;

means for replacing the data packet that is presumed faulty with a null packet; and means for replacing each data packet received with a null packet for a prespecified period of time after the time is logged in step (d).

10. A computer-implemented method for processing signals encoding computer readable data being input to a computer by an input device, said data being of a type transmitted in the form of data packets comprising a plurality of bytes and said data being further of a type lacking synchronization data, said method steps comprising: detecting a false data packet; recording the current system time; ignoring any subsequent packets that are received within a predetermined number of milliseconds of the false data packet; and replacing the false packet with a null packet.

* * * * *